W. J. O'BRIEN.
SIGNAL.
APPLICATION FILED DEC. 9, 1909.
974,810.
Patented Nov. 8, 1910.
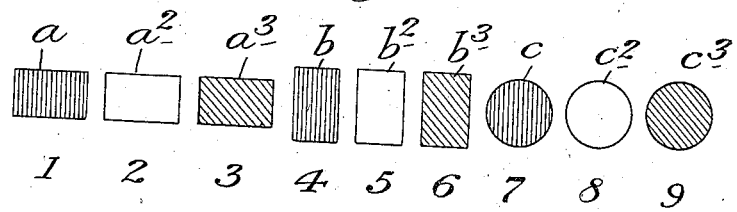
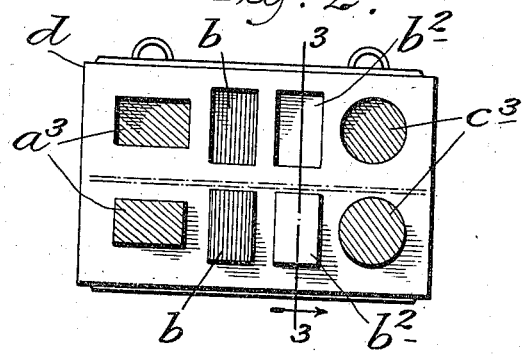
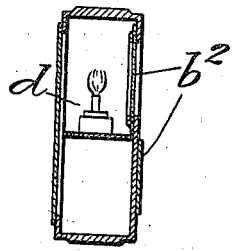
WITNESSES:
INVENTOR.
William J. O'Brien.
BY
ATTORNEYS.

UNITED STATES PATENT OFFICE.

WILLIAM J. O'BRIEN, OF LONG ISLAND CITY, NEW YORK.

SIGNAL.

974,810.  Specification of Letters Patent.  Patented Nov. 8, 1910.

Application filed December 9, 1909. Serial No. 532,195.

*To all whom it may concern:*

Be it known that I, WILLIAM J. O'BRIEN, a citizen of the United States, and residing at Long Island City, in the county of Queens and State of New York, have invented certain new and useful Improvements in Signals, of which the following is a specification, such as will enable those skilled in the art to which it appertains to make and use the same.

This invention relates to signals and particularly to signal lights for use in connection with automobiles to distinctly determine or give the registered number thereof, and the object of the invention is to provide a signal of this class by means of which the number of the vehicle is determined by the use of colored lenses or panels, each of which represents a certain definite number, said lenses or panels being adapted to be combined so as to form any desired number; a further object being to provide a signal of the class specified to be used either at night or in the daytime, and which in addition to serving as a signal to give the number of an automobile or other vehicle may also be used for other purposes.

It is a well known fact that colors are more easily remembered than numbers and especially is this true of certain people and particularly of the young; and this fact has been utilized in the invention which forms a basis of this application, in which I employ a plurality of lenses or panels designated by numbers and also distinguished by colors, the said lenses or panels being also divided into series of different forms, so as to facilitate the practical application of the invention to everyday use, and in the practice of my invention, as hereinafter described and claimed, I provide nine lenses or panels, which represent the numerals from 1 to 9 inclusive, and said lenses or panels are distinctly colored, and are also preferably divided into three series of three each, the said series having distinctive characteristics.

The invention is fully disclosed in the following specification, of which the accompanying drawing forms a part, in which the separate parts of my improvement are designated by suitable reference characters in each of views, and in which:—

Figure 1 is a view showing the nine lenses or panels which I employ, and showing also corresponding numbers; Fig. 2 a front view of a signal lantern made according to my invention, and Fig. 3 a transverse vertical section on the line 3—3 of Fig. 2.

In the practice of my invention, as shown in the accompanying drawing, I provide nine lenses or panels divided into three separate series as shown in Fig. 1, said series each containing three lenses or panels. These lenses or panels represent, in my invention, the numerals from 1 to 9 inclusive, as is also indicated in said figure, and for the purpose of this description the lenses of the first series are designated by the reference characters $a$, $a^2$ and $a^3$; the lenses of the second series by the reference characters $b$, $b^2$ and $b^3$; and the lenses of the third series by the reference characters $c$, $c^2$ and $c^3$. The lenses of each series are also distinctly colored the first lenses of each series being red, the second lenses of each series white and the third lenses of each series green, said colors being ones which are most easily distinguished when illuminated at night and also more easily distinguished in day-light. The separate series of lenses or panels are also distinctively formed, the first series being of oblong, rectangular form and being arranged horizontally, while the second series are of oblong and rectangular form and arranged vertically, and the third series being circular in form.

In constructing a signal lantern, as shown in Figs. 1 and 2 I place in the front thereof, the last of the first series, the first and second of the second series, and the last of the third series of lenses, and these lenses, as will be seen on reference to Fig. 1, are designated by the numbers 3, 4, 5 and 9, and this combination of lenses in the lantern $d$ stand for the number 3459, and it will be understood, of course, that this is the registered number of the vehicle, in connection with which the signal or signal lantern is applied.

The use of the device will be readily understood from the foregoing description.

If an automobile or other vehicle bearing a signal lantern made as shown in Figs. 2 and 3 passes a person on the street and it is desired to take the number thereof, or that the number thereof should be known for any reason, a person seeing the signal remembers the color of the lenses and the arrangement thereof and a reference to the proper record will determine the number of the vehicle.

In practice a lamp or other illuminator $d$ of any preferred construction is placed in the top portion of the lantern and illuminates the lenses as will be readily understood; and if desired panels exactly similar to the lenses may be placed on the front bottom portion of the lantern for use in the daytime, the only difference being that the panels on the bottom portion of the lantern are opaque and no lamp is necessary in order to read these panels in the daytime.

My invention as herein shown and described involves the use of nine panels or lenses, and this will be sufficient for signaling numbers involving not more than nine figures, and this will be all that is necessary in most cases, but if it is desired at any time to signal numbers involving more than nine figures or extending into the billions a distinctive lens or panel may be employed for representing a billion or billions while the remaining characters of the number may be indicated by the nine panels or lenses shown and described.

Having fully described my invention, what I claim as new, and desire to secure by Letters Patent is:—

In a signal device, a predetermined number of panels arranged in line and adapted to represent consecutive numbers, said panels being divided into separate series, the panels of each series being similar in form and differing in form from the panels in the other series, and the separate panels of each series being distinctively colored.

In testimony that I claim the foregoing as my invention I have signed my name in presence of the subscribing witnesses this 7th day of December, 1909.

WILLIAM J. O'BRIEN.

Witnesses:
C. E. MULREANY,
B. M. RYERSON.